June 28, 1949.　　　　L. K. HYDE　　　　2,474,424
RATE OF MOVEMENT CONTROL APPARATUS
Filed July 17, 1946　　　　　　　　　　　　2 Sheets-Sheet 1
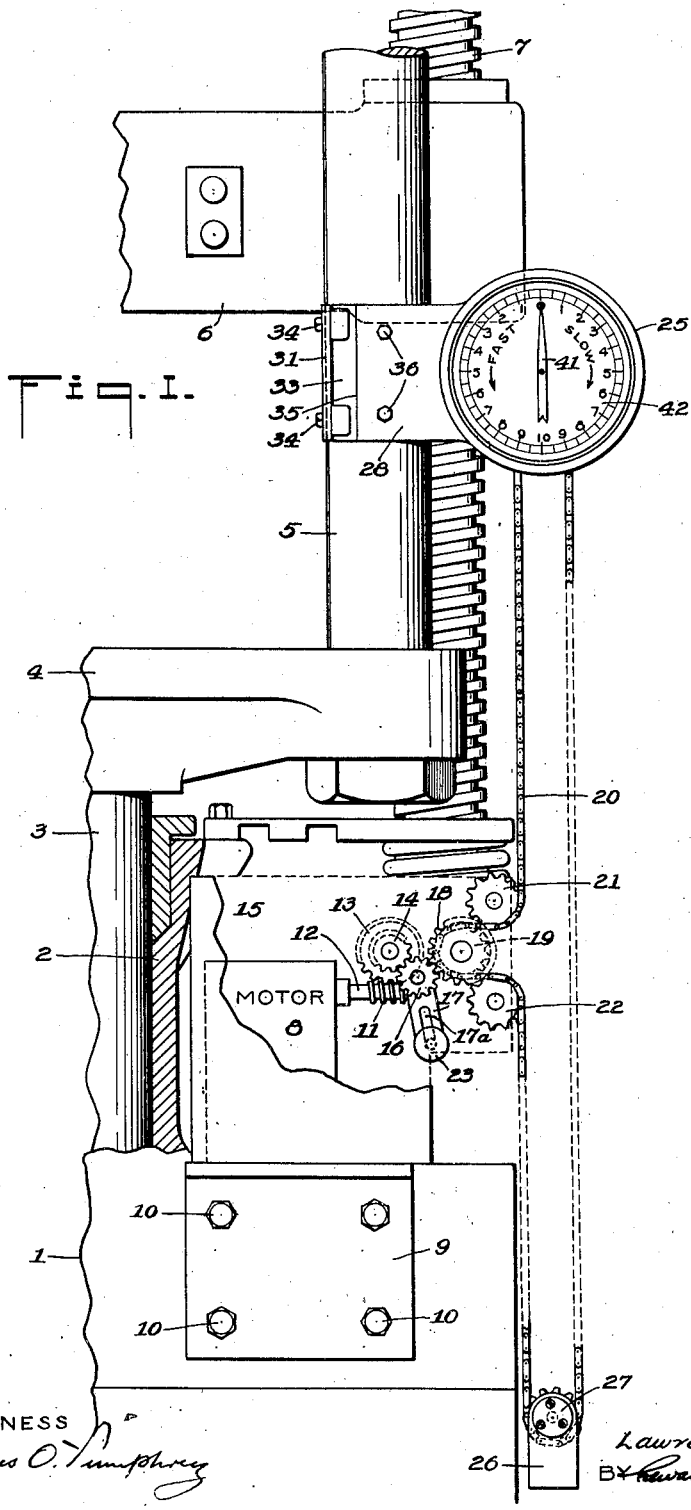
INVENTOR
Lawrence K. Hyde
BY
ATTORNEY June 28, 1949.　　　　　L. K. HYDE　　　　　2,474,424
RATE OF MOVEMENT CONTROL APPARATUS
Filed July 17, 1946　　　　　　　　　　　2 Sheets-Sheet 2
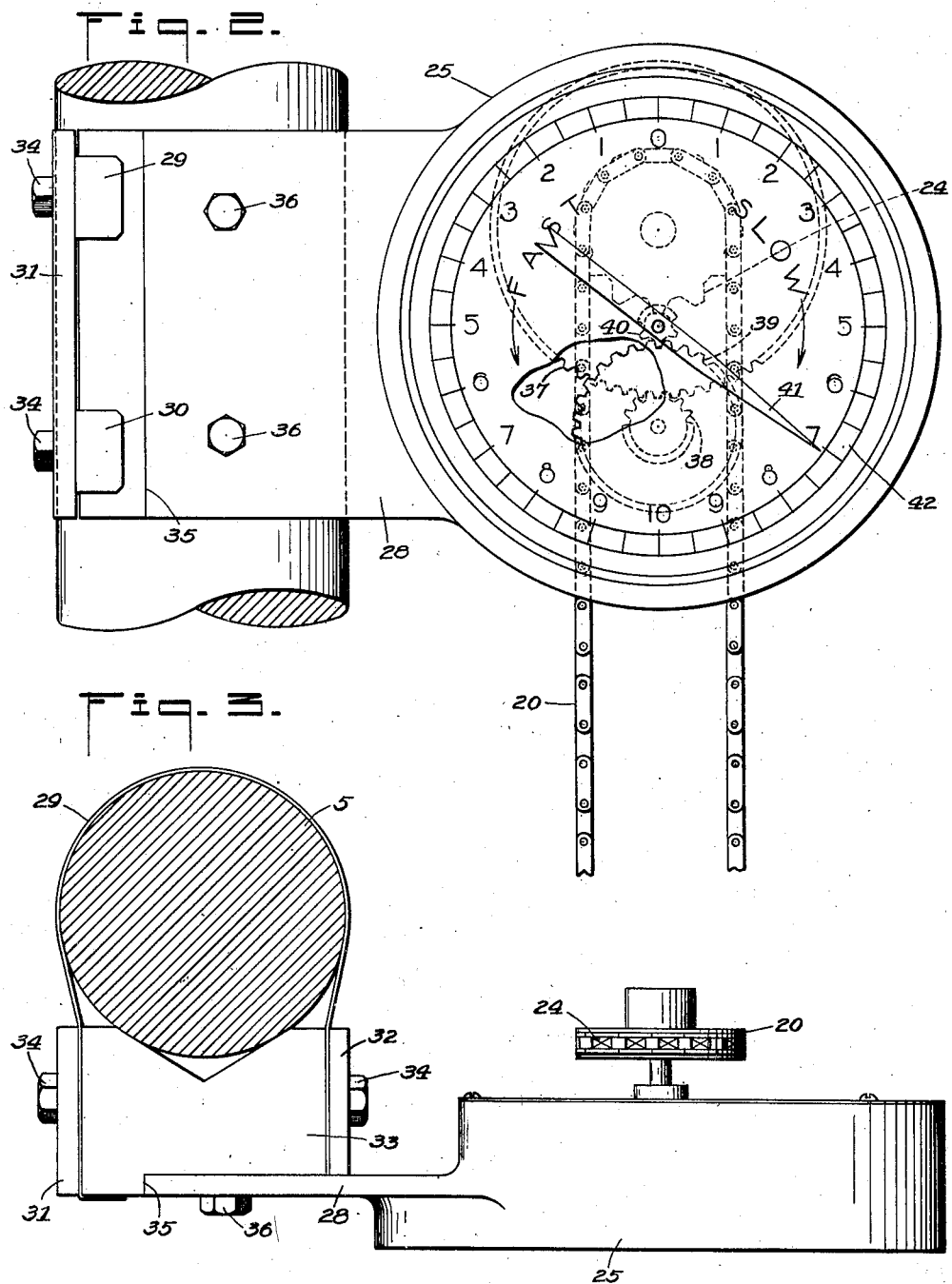
INVENTOR
Lawrence K. Hyde
BY
ATTORNEY Patented June 28, 1949

2,474,424

UNITED STATES PATENT OFFICE 2,474,424

RATE OF MOVEMENT CONTROL APPARATUS

Lawrence K. Hyde, Washington, D. C., assignor to The Baldwin Locomotive Works, a corporation of Pennsylvania Application July 17, 1946, Serial No. 684,392

5 Claims. (Cl. 235—103.5)

This invention relates generally to materials testing apparatus and more particularly to improved means that is responsive to, and is preferably for visually indicating, variations in the speed of movement of a selected element of materials testing apparatus.

In testing, by means of a materials testing machine, the stress-strain qualities of materials and structures, both of which are herein referred to as specimens, it is often desirable to maintain a constant predetermined speed of travel of some element of the testing machine such, for example, as its loading head or platen. Various devices and arrangements heretofore employed for this purpose have been either complicated, expensive or deficient in certain other aspects. While head motion has been specifically selected for purposes of illustration, it will be apparent from the disclosure herein that the construction and principles of operation apply equally as well to other elements whose movement is in response to a given condition whether load, strain, deflection and so forth.

One object of my invention is accordingly to provide improved means for effecting a predetermined speed of motion of a desired element in materials testing apparatus and to accomplish this in a manner that is simple in construction, operation and maintenance and thoroughly reliable and accurate.

Other objects and advantages will be more apparent to those skilled in the art from the following description of the accompanying drawings in which:

Fig. 1 is a front elevation of my improved pacer as attached to a materials testing machine having a hydraulic ram within its base;

Fig. 2 is an enlarged front elevation of the dial of my pacer, with a part of the indicator broken away to show the internal gear mechanism; and Fig. 3 is a plan view of the dial casing.

In Fig. 1, I show a portion of one form, among possible others, of a hydraulic materials testing machine of the type generally illustrated in Patents 2,291,106 and 1,848,468, comprising a base 1, a loading cylinder 2, a hydraulic loading ram 3, a ram head or table 4, and loading columns 5 (only one of which is shown). A sensitive crosshead 6 is adjustably mounted on threaded rods 7 (only one of which is shown) of a usual sensitive frame and remains substantially stationary during tests of specimens. The remainder of the machine is not shown as it is well known in the art. When hydraulic pressure is supplied to cylinder 2, ram 3 is raised, carrying with it platen 4 and loading columns 5, thereby exerting a compression load on a specimen positioned between rising platen 4 and stationary sensitive platen or cross head 6. Manually operated valves (not shown) control the hydraulic pressure supplied to the base of cylinder 2. Although the drawings show only that part of the materials testing machine used for compression tests of specimens, the movement of platen 4, that is, in an upwardly direction, is the same in tests of specimens for tensile strength. As the details of the materials testing machine are immaterial to this invention, it is necessary merely to point out that platen 4 and loading columns 5, in the form of the testing machine herein described, travel upwardly together, whether the specimen is being tested in compression or tension, the columns 5 being used solely for transmitting a loading force to tension specimens.

In the particular embodiment of the invention which is disclosed herein merely for the purpose of illustrating one specific form among possible others that the invention may take in practice, a motor 8, preferably a synchronous electric motor, mounted on a bracket 9 attached to a suitable part of base 1 by bolts 10, 10, imparts motion, through a worm 11 on a shaft 12 of motor 8, to gears 13 and 14 secured to each other for rotation on a shaft mounted on a panel 15 at right angles thereto. The gears thence drive through a gear 16 rotatably mounted on a removable bracket 17, to a gear 18 and a sprocket wheel 19 (shown in dotted lines) which is rotatable on a shaft mounted on panel 15 at right angles thereto. The drive continues by means of sprocket wheel 19 to an endless sprocket chain 20, such motion preferably, though not necessarily, impelling endless sprocket chain 20 in a clockwise direction at a constant predetermined rate of speed. Idler sprocket wheels 21 and 22 provide frictionless bearings over which sprocket chain 20 rides in its progress clockwise. It is obvious that a pulley and endless cable may be substituted for sprocket wheel 19 and endless chain 20, respectively, as the means of power transmission. Pulleys or other bearings also may be substituted for idler sprocket wheels 21 and 22 and for sprocket wheel 24, Figs. 2 and 3. To increase or decrease the speed of sprocket chain 20, without changing the speed of motor 8, gears 13 and 14 may be replaced by gears of different diameters and the idler gear 16 and bracket 17 may be adjusted radially to accommodate the new gears by loosening clamping screw 23. A slot 17a in the bracket permits the radial adjustment. In this simple manner different predetermined speeds of the endless sprocket chain may be obtained. The upper loop of sprocket chain 20 engages sprocket wheel 24, Figs. 2 and 3, rotatably mounted on back of dial casing 25, causing sprocket wheel 24 to rotate clockwise or counterclockwise, as hereinafter more particularly described. The lower loop of the chain hangs by its own weight but to prevent possible slack in the sprocket chain and to assist in giving it stability, a weight 26 with an idler sprocket wheel 27, mounted rotatably in a groove in its upper end, may be suspended by said sprocket wheel 27 in the pendent loop of the chain, as shown in Fig. 1. The chain may be of any convenient length.

Dial casing 25 is rigidly affixed to any suitable part of the machine, moving with the ram 3, such as one of the upwardly movable columns 5, an extension of the dial casing serving as a bracket 28 for this purpose. As shown in Fig. 2, two bands 29 and 30 tightly encircle one of the compression columns 5, both ends of said bands being securely held between plates 31 and 32 and the sides of a V-block 33 by bolts 34, 34. In a recess 35 in the front surface of V-block 33, bracket 28 is held rigidly in position by bolts 36, 36. Thus, dial casing 25, sprocket wheel 24, and the upper loop of endless sprocket chain 20 move upwardly simultaneously with the upward movement of ram 3 and columns 5.

Within dial casing 25, Fig. 2, a gear 37 is rigidly mounted on an extension of the shaft of sprocket wheel 24 so that both gear and sprocket wheel rotate together. Gear 37 is in engagement with a smaller gear 38 which is secured to a gear 39 affixed to the same shaft. Gear 39 drives a gear 40 which is fastened to an indicating pointer 41. It is apparent that clockwise movement of sprocket wheel 24 causes indicator 41, through the above described gearing, also to move clockwise, while a counterclockwise movement of sprocket wheel 24 causes indicator 41 also to move in a counterclockwise direction; it is also apparent that a slight rotary movement of sprocket wheel 24 in either direction is considerably increased in being transmitted through such gearing to responsive indicator 41, making the deflection of the indicator easily readable by the operator of the materials testing machine.

Starting at zero at top center, dial 42 is appropriately graduated, to the left and to the right. The words "Fast" and "Slow" appear on the left hand and on the right hand sides, respectively, of dial 42. When indicator 41 is deflected counterclockwise, designated by the legend "Fast," the operator of the testing machine is apprised of the fact that ram 4 is traveling, or has traveled at some instant, at a speed greater than the predetermined speed of the sprocket chain, and when indicator 41 is deflected clockwise, designated by the legend "Slow," he is informed thereby that ram 4 is traveling, or has traveled at some instant, at a lesser speed than the predetermined speed of the sprocket chain. In either case, he decreases or increases the speed of the ram through adjustment of the valves of the materials testing machine until the responsive indicator 41 comes to a standstill at any displaced position where it might be at the moment. The ram speed will then exactly equal the predetermined speed of the sprocket chain.

The operation of the invention is as follows: When a specimen is to be tested in a materials testing machine for either compression or tensile strength, motor 8, being turned on, imparts motion, as previously described, to worm 11, gears 13, 14, 16 and 18, sprocket wheel 19 and endless sprocket chain 20; thence to sprocket wheel 24, at the back of dial casing 25, causing sprocket wheel 24 to rotate clockwise; the rotary motion of sprocket wheel 24 is thence transmitted to engaging gears 37, 38, 39 and 40 within dial casing 25 and to responsive indicator 41, causing indicator 41 also to rotate in a clockwise direction or toward the "Slow" side of dial 42. As hydraulic pressure is supplied to cylinder 2 by the operator of the materials testing machine and as ram 3 and column 5 begin to rise in response thereto, carrying with it dial casing 25, sprocket wheel 24, and the upper loop of sprocket chain 20, as previously described, the distance between the feed of the sprocket chain (sprocket wheel 19) and sprocket wheel 24 steadily increases with the result that, while sprocket chain 20 continues to travel at the same predetermined rate of speed, the chain no longer rotates sprocket wheel 24 at the same rate of speed, a portion of the chain's feed now being taken up by the chain having to travel an increased distance, and indicator 41, responsive to sprocket wheel 24, shows less and less deflection toward the right hand side of the dial. As the ram speed further increases and sprocket wheel 24 draws farther away from the feed of sprocket wheel 19, sprocket wheel 24 and responsive indicator 41 are rotated less and less as more and more of the chain's feed is diverted from passing over and rotating sprocket wheel 24 to spanning such increasing distance. When the ram speed finally attains the predetermined speed of the sprocket chain, sprocket wheel 24 and responsive indicator 41 cease entirely to turn, for the reason that the upward linear progress of sprocket wheel 24 exactly equals the feed of the sprocket chain, and responsive indicator 41 then stops at a displaced position or points to zero, as the case may be, thereby indicating that there is no longer any difference between the speed of the ram and the predetermined speed of the sprocket chain. It is thus seen that broadly, my apparatus provides an improved form of differential motion mechanism having a linearly movable motion-comparing element which in the specific form shown is the chain 20. The apparatus thus constitutes a rate of motion apparatus in which the endless chain is fed, at a desired predetermined speed, in the direction of movement of the movable member, i. e. the ram 3, head 4 or column 5 as the case may be.

Should the ram speed, for any reason, become greater than the predetermined speed of the sprocket chain, sprocket wheel 24 would in that case be rotated counterclockwise and responsive indicator 41 deflected counterclockwise (designated "Fast,") the reason being that the left hand side of the sprocket chain, although in motion, is traveling at a lesser rate of speed than the rising sprocket wheel 24 which causes its engagement within the chain to be rotated counterclockwise, the right hand side of the chain being free.

My device may also be used as a deflection indicator to measure ram displacement. With the motor 8 turned off, endless sprocket chain 20 remains stationary when ram 3 is raised by application of hydraulic pressure to cylinder 2 of the materials testing machine. The rising ram carries with it dial casing 25, sprocket wheel 24, and the upper loop of endless sprocket chain 20, as before. Sprocket wheel 24, because of the engagement of its teeth with the now stationary sprocket chain 20, is rotated counterclockwise as the sprocket wheel moves upwardly with the ram. Responsive indicator 41 also moves counterclockwise and thus indicates on the dial the ram displacement.

From the foregoing disclosure of my invention, it will be seen that I have devised a simple, inexpensive, accurate and efficient movement indicator which may be readily attached to and made a part of any materials testing machine of the general type herein described.

It will of course be understood that various changes in details of construction and arrangement of parts may be made by those skilled in the art without departing from the spirit of the invention as set forth in the appended claims.

I claim:

1. A rate of motion apparatus for a movable member, comprising an indicating mechanism including a rotatable element and an indicator responsive to rotary movement thereof, a flexible endless power transmission element connected to said rotatable element, power mechanism adapted to drive said flexible element at a predetermined rate of speed, means for supporting one of said mechanisms by said movable member, and means for supporting the other of said mechanisms in a relatively fixed position, whereby said rotatable element is controlled in a predetermined manner by said transmission element upon occurrence of a differential rate of movement between said flexible element and the movable member.

2. The combination set forth in claim 1 further characterized in that said flexible endless element is in the form of a pendent loop one end of which is connected to the indicating mechanism and another portion of which is connected to the power mechanism which drives the endless member at said predetermined rate of speed in the direction of movement of said movable member whereby the indicator remains in a given position when the movable member has the same predetermined speed.

3. The combination set forth in claim 1 further characterized in that said flexible endless member is in the form of a pendent loop one end of which is connected to the indicating mechanism and another intermediate portion of which is connected to the power mechanism which is adapted to drive the endless member at said predetermined rate of speed, and the lower end of the pendent flexible member having a weight to maintain a substantially taut condition of the flexible member while at the same time allowing said lower end to move up or down depending upon the direction of differential movement.

4. The combination set forth in claim 1, further characterized in that the flexible endless element is in the form of a pendent loop having parallel portions with one of said mechanisms connected to an intermediate point of one of said parallel portions, and the lower end of the pendent flexible member extending down below the point of said intermediate connection sufficient to allow free relative movement between said mechanisms even though the power mechanism is not operative, whereby the lower end of the flexible element moves vertically to provide the necessary compensation for any variation in length of the flexible member between said mechanisms during such relative movement between the same.

5. The combination set forth in claim 1 further characterized in that the indicating mechanism is supported upon the movable member as a fixed part thereof to move bodily therewith, and the power mechanism is mounted in a fixed position and having connection with a portion of the flexible element so as to drive that portion in the direction of normal movement of the movable member.

LAWRENCE K. HYDE.

REFERENCES CITED

The following references are of record in the file of this patent:

UNITED STATES PATENTS

| Number | Name | Date |
| --- | --- | --- |
| 2,125,117 | Lewis | July 26, 1938 |
| 2,163,873 | Gibbons | June 27, 1939 |
| 2,164,993 | Lewis | July 4, 1939 |